(12) United States Patent
Manousakis et al.

(10) Patent No.: US 12,484,189 B2
(45) Date of Patent: Nov. 25, 2025

(54) SYSTEMS AND METHODS FOR VAPOR MANAGEMENT IN IMMERSION COOLING

(71) Applicant: Microsoft Technology Licensing, LLC, Redmond, WA (US)

(72) Inventors: Ioannis Manousakis, Redmond, WA (US); Nicholas Andrew Keehn, Kirkland, WA (US); Husam Atallah Alissa, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 146 days.

(21) Appl. No.: 17/925,259

(22) PCT Filed: May 13, 2021

(86) PCT No.: PCT/US2021/032306
§ 371 (c)(1),
(2) Date: Nov. 14, 2022

(87) PCT Pub. No.: WO2021/231768
PCT Pub. Date: Nov. 18, 2021

(65) Prior Publication Data
US 2023/0232583 A1    Jul. 20, 2023

(30) Foreign Application Priority Data

May 13, 2020   (NL) ...................................... 2025574

(51) Int. Cl.
*H05K 7/20*       (2006.01)
*G06F 1/20*       (2006.01)

(52) U.S. Cl.
CPC ............ *H05K 7/203* (2013.01); *G06F 1/206* (2013.01); *H05K 7/20318* (2013.01); *H05K 7/2039* (2013.01)

(58) Field of Classification Search
CPC .. H05K 7/203; H05K 7/20318; H05K 7/2039; G06F 1/206
(Continued)

(56) References Cited

U.S. PATENT DOCUMENTS 3,741,292 A * 6/1973 Aakalu ................. H01L 23/427
                                                          361/698
3,851,221 A * 11/1974 Beaulieu ................ H01L 23/44
                                                          361/728
(Continued)

FOREIGN PATENT DOCUMENTS

EP           0167665 A1       1/1986
EP           3232753 A1      10/2017
(Continued)

OTHER PUBLICATIONS

Chu, et al., "Thermal Card and Deflector System for Augmenting Emersion Cooling", In IBM Technical Disclosure Bulletin, vol. 10, Issue 10, Mar. 1, 1968, 2 Pages.
(Continued)

*Primary Examiner* — Anatoly Vortman
(74) *Attorney, Agent, or Firm* — Ray Quinney & Nebeker P.C.; Paul N. Taylor

(57) ABSTRACT

A system for thermal management of a computing device includes an immersion chamber, a cooling fluid, a plurality of heat-generating components, and a means for removing vapor from a cooling volume of the cooling fluid. The cooling fluid is positioned in the immersion chamber and fills at least a portion of the immersion chamber. The plurality of heat-generating components is positioned in the cooling fluid and arranged in a series. The series defines the cooling volume of the cooling fluid contacting the plurality of heat-generating components to cool the plurality of heat-generating components.

14 Claims, 4 Drawing Sheets

(58) Field of Classification Search
USPC .................................................. 361/679.47
See application file for complete search history.

(56) References Cited

U.S. PATENT DOCUMENTS

| | | | | |
|---|---|---|---|---|
| 4,312,012 | A * | 1/1982 | Frieser | H01L 23/427 257/713 |
| 4,619,316 | A * | 10/1986 | Nakayama | F28F 13/187 257/713 |
| 4,949,164 | A * | 8/1990 | Ohashi | H01L 23/427 165/80.4 |
| 5,038,571 | A * | 8/1991 | Yokouchi | C09K 5/045 62/51.1 |
| 5,305,184 | A * | 4/1994 | Andresen | H05K 7/20872 361/720 |
| 10,674,641 | B2 * | 6/2020 | Shepard | H05K 7/203 |
| 11,357,130 | B2 * | 6/2022 | Manousakis | G06F 1/20 |
| 11,533,829 | B2 * | 12/2022 | Alissa | H05K 7/203 |
| 11,792,962 | B2 * | 10/2023 | Alissa | H05K 7/203 361/699 |
| 12,108,568 | B2 * | 10/2024 | Ramakrishnan | H05K 7/203 |
| 12,120,851 | B2 * | 10/2024 | Trieu | H05K 7/20309 |
| 2016/0345461 | A1 | 11/2016 | Smith | |
| 2018/0343774 | A1 | 11/2018 | Smith | |

FOREIGN PATENT DOCUMENTS

| | | |
|---|---|---|
| JP | S61251159 A | 11/1986 |
| JP | 2008028124 A | 2/2008 |
| JP | 2009139005 A | 6/2009 |
| JP | 2012531056 A | 12/2012 |
| WO | 2014120276 A1 | 8/2014 |

OTHER PUBLICATIONS

"Search Report Issued in Netherlands Patent Application No. N2025574", Mailed Date: Feb. 8, 2021, 14 Pages.

"International Search Report and Written Opinion Issued in PCT Application No. PCT/US21/032306", Mailed Date: Aug. 24, 2021, 20 Pages.

Communication under Rule 71(3) Received in European Patent Application No. 21728135.1, mailed on Mar. 19, 2025, 08 pages.

Notice of grant Received for Netherlands Application No. N2025574, mailed on Nov. 30, 2021, 1 page. W/o English translation.

Office Action Received for Japanese Application No. 2022-569021, mailed on Jan. 10, 2025, 06 Pages (English Translation Provided).

Notice of Allowance Received for Japan Application No. 2022-569021, mailed on Jun. 9, 2025, 5 pages. (English Translation Provided).

Notice of Preliminary Rejection Received for Korean Application No. 10-2022-7039441, mailed on Apr. 28, 2025, 17 Pages (English Translation Provided).

* cited by examiner

SYSTEMS AND METHODS FOR VAPOR MANAGEMENT IN IMMERSION COOLING

BACKGROUND

Background and Relevant Art

Computing devices can generate a large amount of heat during use. The computing components can be susceptible to damage from the heat and commonly require cooling systems to maintain the component temperatures in a safe range during heavy processing or usage loads. Liquid cooling can effectively cool components as liquid cooling fluids have more thermal mass than air or gas cooling. The liquid cooling fluid can be maintained at a lower temperature by allowing vaporized fluid to rise out of the liquid. The vapor in the cooling liquid can adversely affect the cooling performance of the cooling fluid.

BRIEF SUMMARY

In some embodiments, a system for thermal management of a computing device includes an immersion chamber, a cooling fluid, a plurality of heat-generating components, and a means for removing vapor from a cooling volume of the cooling fluid. The cooling fluid is positioned in the immersion chamber and fills at least a portion of the immersion chamber. The plurality of heat-generating components is positioned in the cooling fluid and arranged in a series. The series defines the cooling volume of the cooling fluid contacting the plurality of heat-generating components to cool the plurality of heat-generating components.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which.

DETAILED DESCRIPTION

The present disclosure relates generally to systems and methods for thermal management of electronic devices or other heat-generating components. Immersion chambers surround the heat-generating components in a liquid cooling fluid, which conducts heat from the heat-generating components to cool the heat-generating components. As the cooling fluid absorbs heat from the heat-generating components, the temperature of the cooling fluid increases and the cooling fluid may vaporize, introducing vapor into the liquid of the cooling fluid.

In some embodiments, the thermal management of the heat-generating components includes removing or managing the vapor in a cooling volume of the cooling fluid proximate the heat-generating components. As the amount of vapor increases in the cooling volume, the thermal conductivity and thermal mass of the cooling fluid in the cooling volume decreases. The resulting effect is known as dryout. Dryout results in the thermal management capacity of the cooling volume decreasing and the temperature of the heat-generating components may rise in an undesirable and/or uncontrolled manner.

In some embodiments, dryout can be limited and/or prevented through the use of one or more of the systems and/or methods described herein. Vaporization of the cooling fluid requires thermal energy to overcome the latent heat of vaporization, allowing some amount of vaporization to remove thermal energy in addition to convective cooling by the liquid cooling fluid. By allowing some vaporization without allowing dryout conditions to occur, thermal management can be improved.

Figure 1:
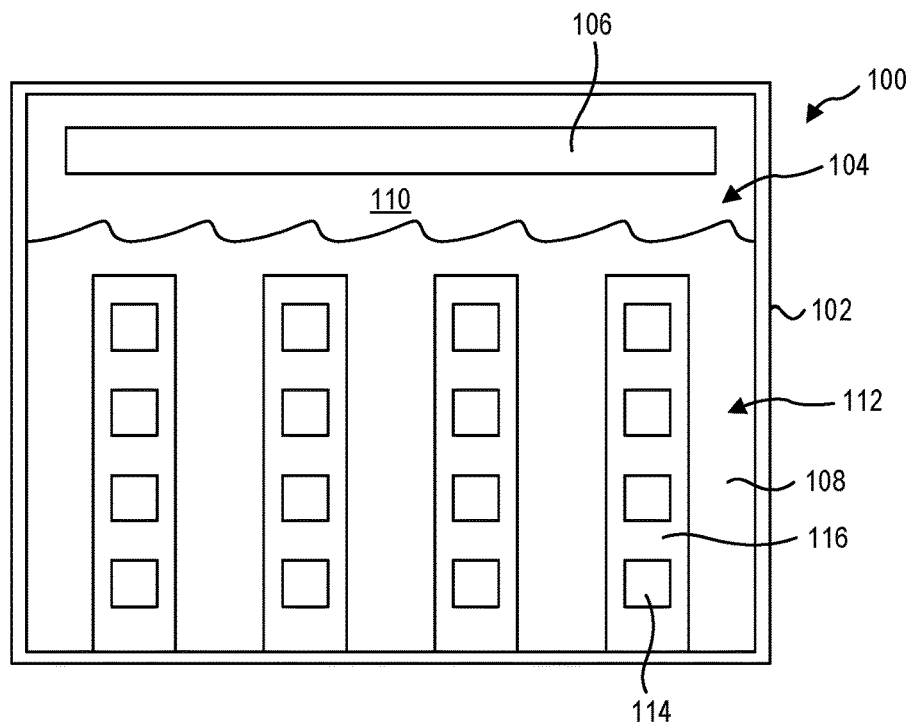
FIG. 1 is a side schematic representation of an immersion cooling system, according to at least one embodiment of the present disclosure.

Referring now to FIG. 1, an immersion cooling system 100 according to the present disclosure includes a chamber 102 with a cooling fluid 104 positioned therein. A condenser 106 is positioned at the top of the cooling fluid 104 above the liquid cooling fluid 108 and in a vapor 110 of the cooling fluid 104. The condenser 106 cools part of the vapor 110 of the cooling fluid 104 back into a liquid phase, removing thermal energy from the system and reintroducing the cooling fluid 104 into the immersion bath 112 of the liquid cooling fluid 108.

In some embodiments, the immersion bath 112 of the liquid cooling fluid 108 has a plurality of heat-generating components 114 positioned in the liquid cooling fluid 108.

The liquid cooling fluid 108 surrounds the heat-generating components 114 and may surround other objects or parts attached to the heat-generating components 114. In some embodiments, the heat-generating components 114 are positioned in the liquid cooling fluid 108 on one or more supports 116. The support 116 may support one or more heat-generating components 114 in the liquid cooling fluid 108 and allow the cooling fluid 104 to move around the heat-generating components 114. In some embodiments, the support 116 is thermally conductive to conduct heat from the heat-generating components 114. The support(s) 116 may increase the effective surface area from which the cooling fluid 104 may remove heat through convective cooling. One or more of the heat-generating components 114, in some embodiments, includes a heat sink or other device attached to the heat-generating component 114 to conduct away thermal energy and effectively increase the surface area of the heat-generating component 114.

Figure 2:
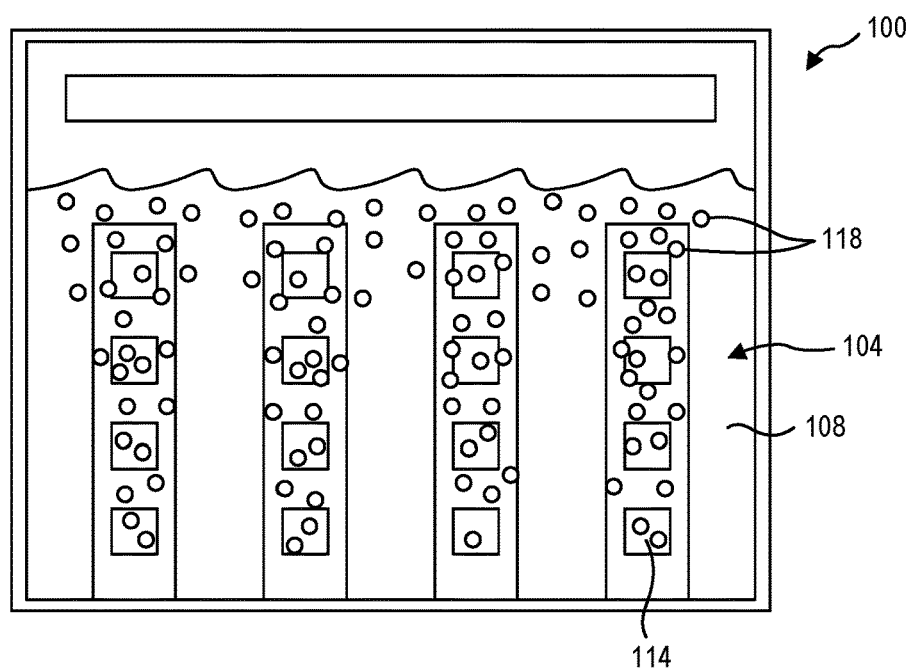
FIG. 2 is a side schematic representation of the immersion cooling system of FIG. 1 during vaporization of the cooling fluid, according to at least one embodiment of the present disclosure.

As described, conversion of the liquid cooling fluid to a vapor phase requires the input of thermal energy to overcome the latent heat of vaporization and may be an effective mechanism to increase the thermal capacity of the cooling fluid and remove heat from the heat-generating components. As shown in FIG. 2, formation of the vapor bubbles 118 in the liquid cooling fluid 108 is not uniform in a conventional immersion cooling system 100. In a conventional system with vertically-aligned heat-generating components 114, equal heat generation by the heat-generating components 114 produces vaporization of the cooling fluid 104 along the vertical stack of heat-generating components 114. Because the vapor bubbles 118 rise in the liquid cooling fluid 108, the heat-generating components 114 that are higher in the vertical stack experience a higher vapor-to-liquid ratio in the region of the cooling fluid 104 immediately surrounding the heat-generating components as liquid cooling fluid 108 vaporizes near the heat-generating component 114 and vapor bubbles 118 ascend from lower in the liquid cooling fluid.

In some embodiments according to the present disclosure, a system for thermal management of computing devices includes one or more mechanisms for removing vapor from the cooling volume of cooling fluid immediately surrounding the heat-generating components. The cooling volume is the region of the cooling fluid (including both liquid and vapor phases) that is immediately surrounding the heat-generating components and is responsible for the convective cooling of the heat-generating components. In some embodiments, the cooling volume is the volume of cooling fluid within 5 millimeters (mm) of the heat-generating components. The cooling volume is, in some embodiments, the volume of cooling fluid within 5 mm of the vertical stacks (supports and heat-generating components). In some embodiments, the cooling volume is defined by a vertical cylinder around each of the vertical stacks where no portion of the cylinder is within 5 mm of the heat-generating components.

The immersion cooling systems described herein include one or more mechanisms for removing vapor from the cooling volume and maintaining a vapor-to-liquid ratio below a target value even when the heat-generating components are operating at maximum load. In some embodiments, the cooling volume remains less than 50% vapor when the heat-generating components are operating at maximum load. The cooling volume remains less than 25% vapor, in some embodiments, when the heat-generating components are operating at maximum load. In some embodiments, the cooling volume remains less than 15% vapor when the heat-generating components are operating at maximum load. The cooling volume remains less than 10% vapor, in some embodiments, when the heat-generating components are operating at maximum load. In some embodiments, the cooling volume remains less than 5% vapor when the heat-generating components are operating at maximum load.

The cooling fluid has a boiling temperature below a critical temperature at which the heat-generating components experience thermal damage. For example, the heat-generating components may be computing components that experience damage above 100° Celsius (C). In some embodiments, the boiling temperature of the cooling fluid is less than a critical temperature of the heat-generating components. The boiling temperature of the cooling fluid is, in some embodiments, less than about 90° C. In some embodiments, the boiling temperature of the cooling fluid is less than about 80° C. In some embodiments, the boiling temperature of the cooling fluid is less than about 70° C. The cooling fluid, in some embodiments, includes water. In some embodiments, the cooling fluid includes glycol. The cooling fluid includes, in some embodiments, a combination of water and glycol. In some embodiments, the cooling fluid is an aqueous solution. The cooling fluid, in some embodiments, is an electronic liquid, such as FC-72 available from 3M, or similar non-conductive fluids. In some embodiments, the heat-generating components, supports, or other elements of the immersion cooling system positioned in the cooling fluid have nucleation sites on a surface thereof that promote the nucleation of vapor bubbles of the cooling fluid at or below the boiling temperature of the cooling fluid.

In some embodiments, the immersion cooling system includes one or more mechanisms for displacing the vapor from the cooling volume to reduce and/or maintain the vapor-to-liquid ratio. An angled vapor diffuser may be positioned above one or more of the heat-generating components in the immersion bath. The vapor diffuser is angled relative to the direction of vapor flow (i.e., vertically upward) such that vapor bubbles generated by the heat-generating components encounter the angled vapor diffuser and are urged in a lateral direction as the vapor bubbles ascend in the liquid due to the relative buoyancy of the vapor.

In some embodiments, at least one vapor diffuser is planar with a surface oriented at a constant angle relative to the direction of vapor flow across the surface. At least one vapor diffuser, in some embodiments, has a plurality of surfaces (or a curved surface) such that a portion of the vapor diffuser is oriented at a first angle and a portion of the vapor diffuser is oriented at a different second angle to direct the vapor bubbles in different lateral directions. In some examples, the vapor diffuser is a V-shape with a portion of the vapor generated by the heat-generating component directed in a first lateral direction and another portion of the vapor directed in a second lateral direction. The vapor diffuser directs all of the vapor generated, in some embodiments, by the associated heat-generating component in a first direction. In some embodiments, the vapor diffuser directs approximately half of the vapor in a first direction and half of the vapor in a second direction.

In some embodiments, a combination of vapor diffuser geometries can be used to distribute vapor bubbles throughout the immersion chamber and away from the vertical stacks or series of heat-generating component. For example, at least one of the vapor diffusers may be oriented at a first angle relative to the direction of vapor flow, and a second vapor diffuser may be oriented at a second angle relative to the direction of vapor flow. In some examples, the immersion cooling system includes at least one vapor diffuser with a single planar surface and a second vapor diffuser with a plurality of planar surfaces and/or curved surfaces.

Figure 3:
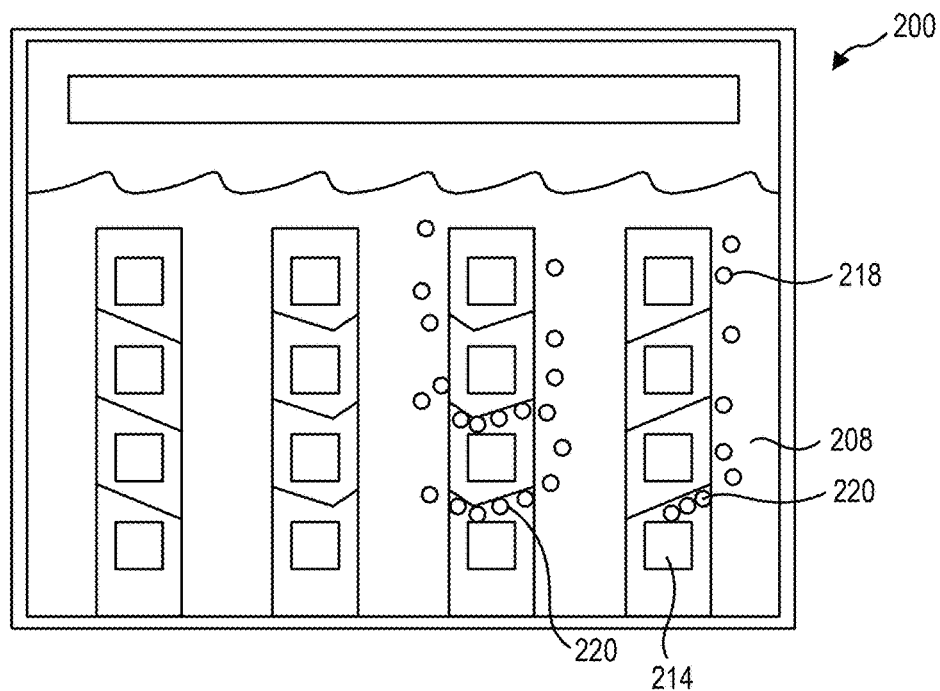
FIG. 3 is a side schematic representation of an immersion cooling system with vapor diffusers, according to at least one embodiment of the present disclosure.

Referring now to FIG. 3, an embodiment of an immersion cooling system 200 is shown with vapor diffusers 220 positioned above and/or between at least some of the heat-generating components 214 in the liquid cooling fluid 208. The heat-generating components 214 raise the temperature of the liquid cooling fluid 208 adjacent the heat-generating components 214 until the liquid cooling fluid 208 vaporizes into vapor bubbles 218. The vapor bubbles 218 rise in the liquid cooling fluid 208 until the bubbles encounter a vapor diffuser, which directs the vapor bubbles 218 in a lateral direction away from the heat-generating components 214 above (e.g., in the direction of vapor flow).

The vapor diffusers may further vary in spatial orientation within the immersion chamber in three dimensions. For example, in a series of heat-generating components, a first heat-generating component may have a first vapor diffuser positioned above the first heat-generating component and a second heat-generating component in the series positioned above the first heat-generating component may have a second vapor diffuser positioned above the second heat-generating component. The first vapor diffuser and the second vapor diffuser may be oriented at the same angle relative to the direction of vapor flow (e.g., 30°), but be oriented in different lateral directions such as the first vapor diffuser directing vapor bubbles to the right of the series of heat-generating components and the second vapor diffuser directing vapor bubbles to the left of the series of heat-generating components. In some examples, further vapor diffusers in the series may direct vapor bubbles forward and/or backward (orthogonally to the first vapor diffuser and second vapor diffusers).

In some embodiments, a vapor diffuser has different textures on a bottom side and on a top side. For example, the bottom side may be smooth or smoother than the top side to allow vapor bubbles to flow along the bottom side unimpeded. The top side may have a texture with greater relief, such as nucleation sites or a rippled or uneven texture that is less smooth than the bottom side. The textured top side may allow rising bubbles to be pushed away and not get caught on the top side when floating up and around the edge of the vapor diffuser. Further, the textured top side may encourage any bubbles that form on the top side to more easily release from the top side and not remain trapped against the top side surface. In some embodiments, an edge of the vapor diffuser includes one or more release features to encourage bubbles to release upward in the vapor flow direction and not cling to or otherwise remain at the edge and impede flow. For example, a release feature may include an uneven or not straight edge that limits vortex formation, so bubbles are not caught in a vortex at the edge flow and swept around to the top side of the vapor diffuser.

Vapor diffusers allow the immersion chamber to alter a vapor flow path from the upward direction of vapor flow. By directing the vapor path away from the cooling volume, the immersion cooling system can control a vapor-to-liquid ratio of the cooling volume and improve cooling efficiency. Thermal control devices can adjust the fluid temperature locally to control a vapor-to-liquid ratio of the cooling volume and improve cooling efficiency.

In some embodiments, micro-condensers are positioned in the immersion bath of the liquid cooling fluid. The micro-condensers can lower the temperature of the cooling fluid below a vaporization temperature to condense vapor in the immersion bath back into the liquid phase. The micro-condensers, in some embodiments, are solid-state coolers, such as Peltier coolers. In some embodiments, the micro condensers include conduits to move a secondary cooling fluid (e.g., refrigerant) through the micro-condensers, where the secondary cooling fluid is at a lower temperature than the cooling fluid of the immersion bath. In some embodiments, the micro-condensers are at least 2 millimeters from a surface of the heat-generating components.

Figure 4:
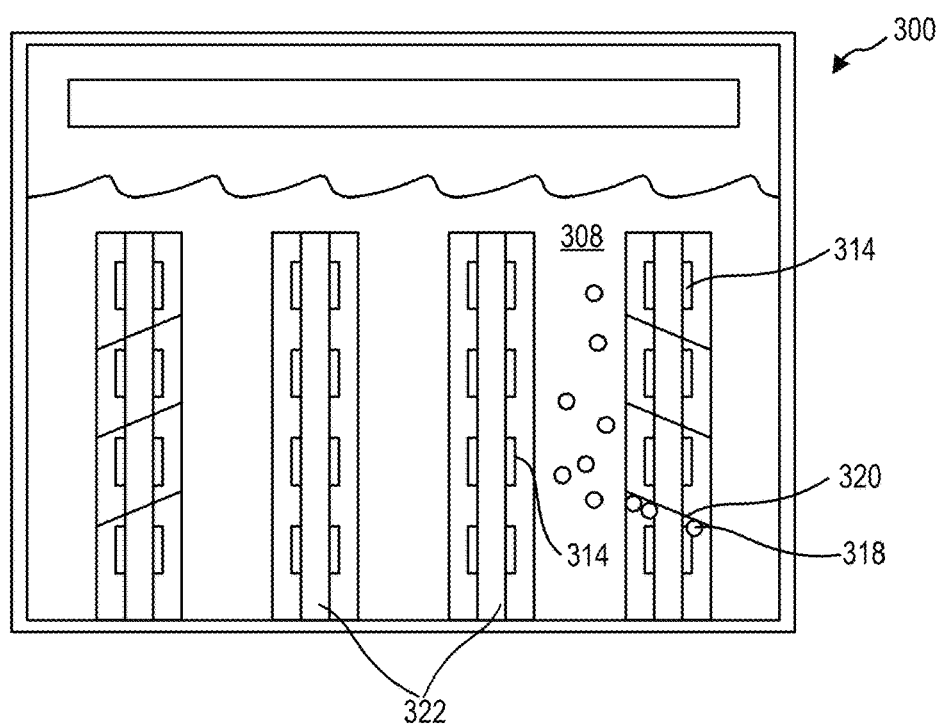
FIG. 4 is a side schematic representation of an immersion cooling system with local thermal control devices, according to at least one embodiment of the present disclosure.

FIG. 4 illustrates another embodiment of an immersion cooling system 300 with vapor diffusers 320 positioned adjacent the heat-generating components 314 on the outside stacks and micro-condensers 322 positioned adjacent the heat-generating components 314 on the inside stacks. In some embodiments, the vapor bubbles 318 generated by the heat-generating components 314 on the outside stacks are directed toward the micro-condensers 322, which then lower the temperature of the liquidly cooling fluid 308 and the vapor bubbles 318 to condense the vapor bubbles 318 back into the liquid cooling fluid 308.

In some embodiments, the vaporization temperature of the cooling fluid can be adjusted by pressurizing the immersion chamber. For example, most fluids exhibit an increase in vaporization temperature associated with an increase in pressure. In some embodiments, the cooling fluid can be pressurized to increase the vaporization temperature. In some embodiments, the cooling fluid can be dynamically pressurized in response to dryout conditions. For example, a vapor sensor, such as an optical sensor that measure light scattering in the cooling fluid, may measure the vapor-to-liquid ratio. When a vapor-to-liquid ratio exceeds a threshold value, an increase in pressure within the immersion chamber (and associated increase in pressure on the cooling fluid) increases the vaporization temperature of the cooling fluid. While the liquid cooling fluid may then further increase in temperature, temporarily limiting the effectiveness of cooling the heat-generating components, the increase in vaporization temperature may limit vapor formation and prevent a compounding dryout effect.

In some embodiments, combinations of vapor diffusers, micro-condensers, and other devices may be used to control a vapor-to-liquid ratio of the cooling fluid in the cooling volume. For example, vapor diffusers may be used to direct vapor away from heat-generating components and toward micro-condensers. In other examples, vapor diffusers may direct vapor toward nucleation rods or plates that promote the formation of vapor bubbles outside of the cooling volume. This can remove heat from the liquid cooling fluid without increasing the vapor-to-liquid ratio in the cooling volume.

Figure 5:
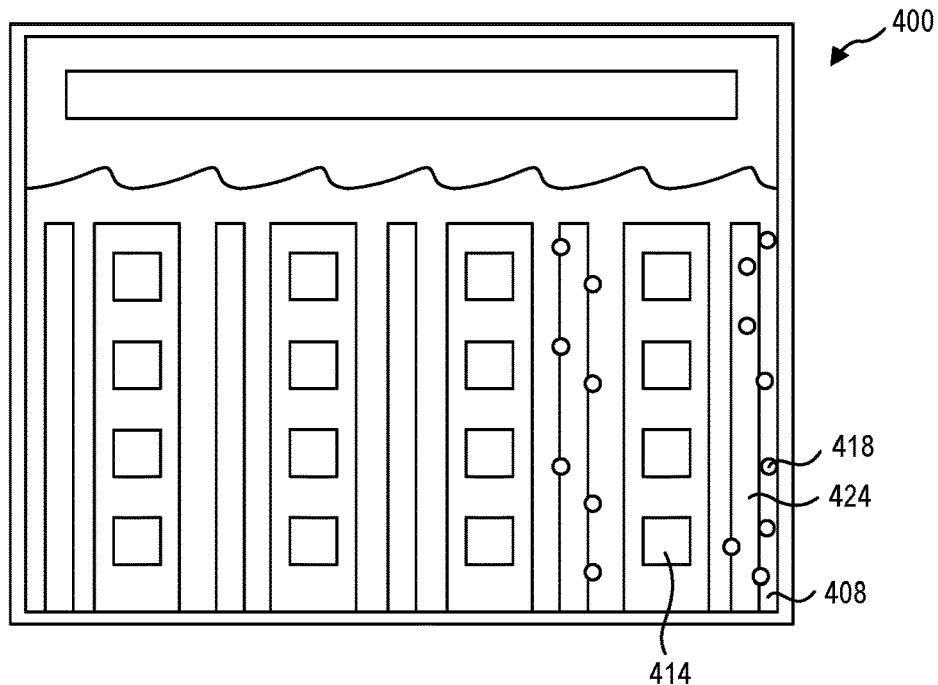
FIG. 5 is a side schematic representation of an immersion cooling system with nucleation rods, according to at least one embodiment of the present disclosure.

FIG. 5 illustrates an example of an immersion cooling system 400 that positions nucleation rods 424 laterally between the series of heat-generating components 414. The nucleation rods 424 promote the formation of vapor bubbles 418 in the liquid cooling fluid 408 around the heat-generating components 414. The vapor bubbles 418 can then rise through the liquid cooling fluid 408 in the direction of the vapor flow without encountering the heat-generating components 414.

Figure 6:
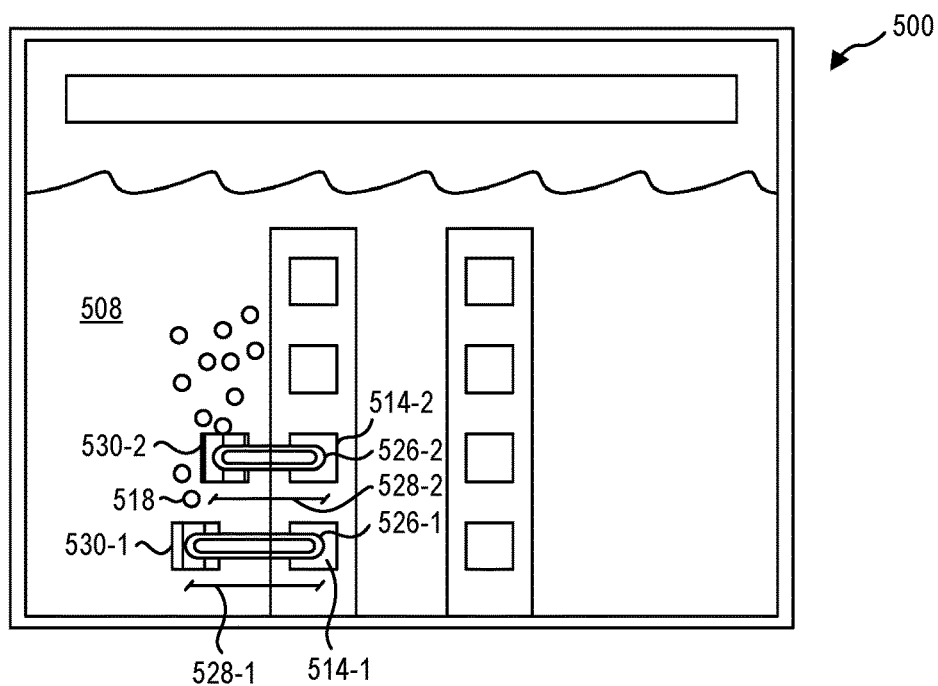
FIG. 6 is a side schematic representation of an immersion cooling system with laterally-positioned thermal transfer devices, according to at least one embodiment of the present disclosure.

In some embodiments, thermal control devices applied to the individual heat-generating components, such as heat sinks, cooling fins, heat pipes, vapor chambers, or other thermal transfer devices can promote the vaporization of the liquid cooling fluid due to the individual heat-generating components at particular positions in the immersion bath. FIG. 6 illustrates an embodiment with a first heat-generating component 514-1 in a vertical stack with a first thermal transfer device 526-1 with a first width 528-1. The first thermal transfer device 526-1 transfers energy laterally to a heat sink 530-1 or other device that promotes vapor bubble 518 formation at a first lateral location the first width 528-1 away from the first heat-generating component 514-1. A second heat-generating component 514-2 positioned above the first in the vertical stack has a second thermal transfer device 526-2 with a second width 528-2. The second thermal transfer device 526-2 promotes vapor formation at the second width, such that the second heat sink 530-2 is not in a vapor path of the first thermal transfer device 526-1 or first heat sink 530-1. Therefore, vaporization of the cooling fluid 508 is promoted without producing a dryout effect on a subsequent heat-generating component, thermal transfer device, or heat sink.

In another example, the series of heat-generating components can be positioned in the cooling fluid such that each heat-generating component in the series is displaced laterally from the previous heat-generating component. In some embodiments, the series is oriented at an angle to the direction of vapor flow, causing each heat-generating component in the series to vaporize cooling fluid in a difference vertical vapor path. In a tightly packed cooling system, vapor diffusers may partition each series from one another to prevent the vapor generated by heat-generating components of a first series from causing dryout in the heat-generating components of a second series.

Figure 7:
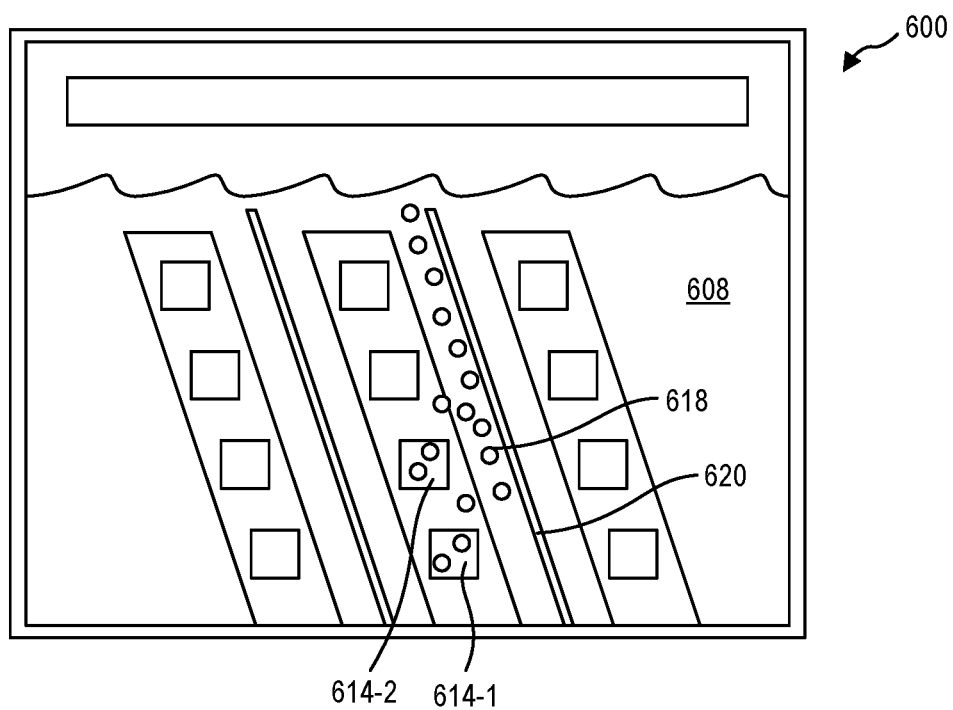
FIG. 7 is a side schematic representation of an immersion cooling system with laterally displaced heat-generating components in a series, according to at least one embodiment of the present disclosure.

FIG. 7 represents an embodiment of an immersion cooling system 600 with a plurality of heat-generating components 614 arranged in angled series. Each series is oriented at an angle to the direction of vapor flow, such that a first heat-generating component 614-1 and a second heat-generating component 614-2 are not laterally overlapping with one another (e.g., a vertical flow path from the first heat-generating components 614-1 does not coincide with the second heat-generating component 614-2). Vapor bubbles 618 generated by the heat of the first heat-generating component 614-1 rise upward in the liquid cooling fluid 608. In some embodiments, vapor diffusers 620 can direct the vapor bubbles 618 away from heat-generating components 614 of other series and limit and/or prevent dryout effects on neighboring series.

In embodiments of immersion cooling systems with heat-generating components including computing components, similar computing components can be aggregated into stacks or series. For example, a first series of heat-generating components may be graphical processing units (GPUs) and a second series of heat-generating components may be central processing units (CPUs). In other examples, a first immersion cooling system houses GPUs and a second immersion cooling system houses CPUs.

INDUSTRIAL APPLICABILITY

The present disclosure relates generally to systems and methods for thermal management of electronic devices or other heat-generating components. Immersion chambers surround the heat-generating components in a liquid cooling fluid, which conducts heat from the heat-generating components to cool the heat-generating components. As the cooling fluid absorbs heat from the heat-generating components, the temperature of the cooling fluid increases and the cooling fluid may vaporize, introducing vapor into the liquid of the cooling fluid.

In some embodiments, the thermal management of the heat-generating components includes removing or managing the vapor in a cooling volume of the cooling fluid proximate the heat-generating components. As the amount of vapor increases in the cooling volume, the thermal conductivity and thermal mass of the cooling fluid in the cooling volume decreases. The resulting effect is known as dryout. Dryout results in the thermal management capacity of the cooling volume decreasing and the temperature of the heat-generating components may rise in an undesirable and/or uncontrolled manner.

In some embodiments, dryout can be limited and/or prevented through the use of one or more of the systems and/or methods described herein. Vaporization of the cooling fluid requires thermal energy to overcome the latent heat of vaporization, allowing some amount of vaporization to remove thermal energy in addition to convective cooling by the liquid cooling fluid. By allowing some vaporization without allowing dryout conditions to occur, thermal management can be improved.

An immersion cooling system according to the present disclosure includes a chamber with a cooling fluid positioned therein. A condenser is positioned at the top of the cooling fluid above the liquid cooling fluid and in a vapor region of the cooling fluid. The condenser cools part of the vapor of the cooling fluid back into a liquid phase, removing thermal energy from the system and reintroducing the cooling fluid into the immersion bath of the liquid cooling fluid.

In some embodiments, the immersion bath of the liquid cooling fluid has a plurality of heat-generating components positioned in the liquid cooling fluid. The liquid cooling fluid surrounds the heat-generating components and may surround other objects or parts attached to the heat-generating components. In some embodiments, the heat-generating components are positioned in the liquid cooling fluid on one or more supports. The support may support one or more heat-generating components in the liquid cooling fluid and allow the cooling fluid to move around the heat-generating components. In some embodiments, the support is thermally conductive to conduct heat from the heat-generating components. The support(s) may increase the effective surface area from which the cooling fluid may remove heat through convective cooling. One or more of the heat-generating components, in some embodiments, includes a heat sink or other device attached to the heat-generating component to conduct away thermal energy and effectively increase the surface area of the heat-generating component.

As described, conversion of the liquid cooling fluid to a vapor phase requires the input of thermal energy to overcome the latent heat of vaporization and may be an effective mechanism to increase the thermal capacity of the cooling fluid and remove heat from the heat-generating components. Formation of the vapor bubbles in the liquid cooling fluid is not uniform in a conventional immersion cooling system. In a conventional system with vertically-aligned heat-generating components, equal heat generation by the heat-generating components produces vaporization of the cooling fluid along the vertical stack of heat-generating components. Because the vapor rises in the liquid cooling fluid, the heat-generating components that are higher in the vertical stack experience a higher vapor-to-liquid ratio in the region of the cooling fluid immediately surrounding the heat-generating components as liquid cooling fluid vaporizes near the heat-generating component and vapor bubbles ascend from lower in the liquid cooling fluid.

In some embodiments according to the present disclosure, a system for thermal management of computing devices includes one or more mechanisms for removing vapor from the cooling volume of cooling fluid immediately surrounding the heat-generating components. The cooling volume is the region of the cooling fluid (including both liquid and vapor phases) that is immediately surrounding the heat-generating components and is responsible for the convective cooling of the heat-generating components. In some embodiments, the cooling volume is the volume of cooling fluid within 5 millimeters (mm) of the heat-generating components. The cooling volume is, in some embodiments, the volume of cooling fluid within 5 mm of the vertical stacks (supports and heat-generating components). In some embodiments, the cooling volume is defined by a vertical cylinder around each of the vertical stacks where no portion of the cylinder is within 5 mm of the heat-generating components.

The immersion cooling systems described herein include one or more mechanisms for removing vapor from the cooling volume and maintaining a vapor-to-liquid ratio below a target value even when the heat-generating components are operating at maximum load. In some embodiments, the cooling volume remains less than 50% vapor when the heat-generating components are operating at maximum load. The cooling volume remains less than 25% vapor, in some embodiments, when the heat-generating components are operating at maximum load. In some embodiments, the cooling volume remains less than 15% vapor when the heat-generating components are operating at maximum load. The cooling volume remains less than 10% vapor, in some embodiments, when the heat-generating components are operating at maximum load. In some embodiments, the cooling volume remains less than 5% vapor when the heat-generating components are operating at maximum load.

The cooling fluid has a boiling temperature below a critical temperature at which the heat-generating components experience thermal damage. For example, the heat-generating components may be computing components that experience damage above 100° Celsius (C). In some embodiments, the boiling temperature of the cooling fluid is less than a critical temperature of the heat-generating components. The boiling temperature of the cooling fluid is, in some embodiments, less than about 90° C. In some embodiments, the boiling temperature of the cooling fluid is less than about 80° C. In some embodiments, the boiling temperature of the cooling fluid is less than about 70° C. The cooling fluid, in some embodiments, includes water. In some embodiments, the cooling fluid includes glycol. The cooling fluid includes, in some embodiments, a combination of water and glycol. In some embodiments, the cooling fluid is an aqueous solution. The cooling fluid, in some embodiments, is an electronic liquid, such as FC-72 available from 3M, or similar non-conductive fluids. In some embodiments, the heat-generating components, supports, or other elements of the immersion cooling system positioned in the cooling fluid have nucleation sites on a surface thereof that promote the nucleation of vapor bubbles of the cooling fluid at or below the boiling temperature of the cooling fluid.

In some embodiments, the immersion cooling system includes one or more mechanisms for displacing the vapor from the cooling volume to reduce and/or maintain the vapor-to-liquid ratio. An angled vapor diffuser may be positioned above one or more of the heat-generating components in the immersion bath. The vapor diffuser is angled relative to the direction of vapor flow (i.e., vertically upward) such that vapor bubbles generated by the heat-generating components encounter the angled vapor diffuser and are urged in a lateral direction as the vapor bubbles ascend in the liquid due to the relative buoyancy of the vapor.

In some embodiments, at least one vapor diffuser is planar with a surface oriented at a constant angle relative to the direction of vapor flow across the surface. At least one vapor diffuser, in some embodiments, has a plurality of surfaces (or a curved surface) such that a portion of the vapor diffuser is oriented at a first angle and a portion of the vapor diffuser is oriented at a different second angle to direct the vapor bubbles in different lateral directions. In some examples, the vapor diffuser is a V-shape with a portion of the vapor generated by the heat-generating component directed in a first lateral direction and another portion of the vapor directed in a second lateral direction. The vapor diffuser directs all of the vapor generated, in some embodiments, by the associated heat-generating component in a first direction. In some embodiments, the vapor diffuser directs approximately half of the vapor in a first direction and half of the vapor in a second direction.

In some embodiments, a combination of vapor diffuser geometries can be used to distribute vapor bubbles throughout the immersion chamber and away from the vertical stacks or series of heat-generating component. For example, at least one of the vapor diffusers may be oriented at a first angle relative to the direction of vapor flow, and a second vapor diffuser may be oriented at a second angle relative to the direction of vapor flow. In some examples, the immersion cooling system includes at least one vapor diffuser with a single planar surface and a second vapor diffuser with a plurality of planar surfaces and/or curved surfaces.

The vapor diffusers may further vary in spatial orientation within the immersion chamber in three dimensions. For example, in a series of heat-generating components, a first heat-generating component may have a first vapor diffuser positioned above the first heat-generating component and a second heat-generating component in the series positioned above the first heat-generating component may have a second vapor diffuser positioned above the second heat-generating component. The first vapor diffuser and the second vapor diffuser may be oriented at the same angle relative to the direction of vapor flow (e.g., 30°), but be oriented in different lateral directions such as the first vapor diffuser directing vapor bubbles to the right of the series of heat-generating components and the second vapor diffuser directing vapor bubbles to the left of the series of heat-generating components. In some examples, further vapor diffusers in the series may direct vapor bubbles forward and/or backward (orthogonally to the first vapor diffuser and second vapor diffusers).

In some embodiments, a vapor diffuser has different textures on a bottom side and on a top side. For example, the bottom side may be smooth or smoother than the top side to allow vapor bubbles to flow along the bottom side unimpeded. The top side may have a texture with greater relief, such as nucleation sites or a rippled or uneven texture that is less smooth than the bottom side. The textured top side may allow rising bubbles to be pushed away and not get caught on the top side when floating up and around the edge of the vapor diffuser. Further, the textured top side may encourage any bubbles that form on the top side to more easily release from the top side and not remain trapped against the top side surface. In some embodiments, an edge of the vapor diffuser includes one or more release features to encourage bubbles to release upward in the vapor flow direction and not cling to or otherwise remain at the edge and impede flow. For example, a release feature may include an uneven or not straight edge that limits vortex formation, so bubbles are not caught in a vortex at the edge flow and swept around to the top side of the vapor diffuser.

Vapor diffusers allow the immersion chamber to alter a vapor flow path from the upward direction of vapor flow. By directing the vapor path away from the cooling volume, the immersion cooling system can control a vapor-to-liquid ratio of the cooling volume and improve cooling efficiency. Thermal control devices can adjust the fluid temperature locally to control a vapor-to-liquid ratio of the cooling volume and improve cooling efficiency.

In some embodiments, micro-condensers are positioned in the immersion bath of the liquid cooling fluid. The micro-condensers can lower the temperature of the cooling fluid below a vaporization temperature to condense vapor in the immersion bath back into the liquid phase. The micro-condensers, in some embodiments, are solid-state coolers, such as Peltier coolers. In some embodiments, the micro condensers include conduits to move a secondary cooling fluid (e.g., refrigerant) through the micro-condensers, where the secondary cooling fluid is at a lower temperature than the cooling fluid of the immersion bath. In some embodiments, the micro-condensers are at least 2 millimeters from a surface of the heat-generating components.

In some embodiments, the vaporization temperature of the cooling fluid can be adjusted by pressurizing the immersion chamber. For example, most fluids exhibit an increase in vaporization temperature associated with an increase in pressure. In some embodiments, the cooling fluid can be pressurized to increase the vaporization temperature. In some embodiments, the cooling fluid can be dynamically pressurized in response to dryout conditions. For example, a vapor sensor, such as an optical sensor that measure light scattering in the cooling fluid, may measure the vapor-to-liquid ratio. When a vapor-to-liquid ratio exceeds a threshold value, an increase in pressure within the immersion chamber (and associated increase in pressure on the cooling fluid) increases the vaporization temperature of the cooling fluid. While the liquid cooling fluid may then further increase in temperature, temporarily limiting the effectiveness of cooling the heat-generating components, the increase in vaporization temperature may limit vapor formation and prevent a compounding dryout effect.

In some embodiments, combinations of vapor diffusers, micro-condensers, and other devices may be used to control a vapor-to-liquid ratio of the cooling fluid in the cooling volume. For example, vapor diffusers may be used to direct vapor away from heat-generating components and toward micro-condensers. In other examples, vapor diffusers may direct vapor toward nucleation rods or plates that promote the formation of vapor bubbles outside of the cooling volume. This can remove heat from the liquid cooling fluid without increasing the vapor-to-liquid ratio in the cooling volume.

In some embodiments, thermal control devices applied to the individual heat-generating components, such as heat sinks, cooling fins, heat pipes, vapor chambers, or other thermal transfer devices can promote the vaporization of the liquid cooling fluid due to the individual heat-generating components at particular positions in the immersion bath. For example, a first heat-generating component in a vertical stack can have a first thermal transfer device with a first width. The first thermal transfer device transfers energy laterally to a heat sink or other device that promotes vapor formation at a first lateral location the first width away from the first heat-generating component. A second heat-generating component positioned above the first in the vertical stack has a second thermal transfer device with a second width. The second thermal transfer device promotes vapor formation at a second width, such that the second thermal transfer device is not in a vapor path of the first thermal transfer device. Therefore, vaporization of the cooling fluid is promoted without producing a dryout effect on a subsequent thermal transfer device.

In another example, the series of heat-generating components can be positioned in the cooling fluid such that each heat-generating component in the series is displaced laterally from the previous heat-generating component. In some embodiments, the series is oriented at an angle to the direction of vapor flow, causing each heat-generating component in the series to vaporize cooling fluid in a difference vertical vapor path. In a tightly packed cooling system, vapor diffusers may partition each series from one another to prevent the vapor generated by heat-generating components of a first series from causing dryout in the heat-generating components of a second series.

In embodiments of immersion cooling systems with heat-generating components including computing components, similar computing components can be aggregated into stacks or series. For example, a first series of heat-generating components may be graphical processing units (GPUs) and a second series of heat-generating components may be central processing units (CPUs). In other examples, a first immersion cooling system houses GPUs and a second immersion cooling system houses CPUs.

The present disclosure relates to systems and methods for removing vapor from the cooling volume and maintaining a vapor-to-liquid ratio below a target value according to at least the examples provided in the clauses below:

1. A system for thermal management of a computing device, comprising:
   an immersion chamber;
   a cooling fluid filling at least a portion of the immersion chamber;
   a plurality of heat-generating components positioned in the cooling fluid and arranged in a series, wherein the series defines a cooling volume of the cooling fluid contacting the plurality of heat-generating components to cool the plurality of heat-generating components; and
   a means for removing vapor from the cooling volume of the cooling fluid.

2. The system of clause 1, wherein the means for removing vapor includes a vapor diffuser.

3. The system of clauses 1 or 2, wherein the means for removing vapor includes a thermal control device.

4. The system of clause 3, wherein the thermal control device is a condenser rod.

5. The system of any preceding clause, wherein the means for removing vapor includes a nucleation source outside of the cooling volume.

6. The system of any preceding clause, wherein the cooling fluid comprises glycol.

7. The system of any preceding clause, further comprising a condenser positioned in the immersion chamber and outside of the cooling fluid.

8. The system of any preceding clause, wherein the immersion chamber is pressurized above atmospheric pressure.

9. The system of any preceding clause, wherein at least one of the plurality of heat generating components includes a heat sink positioned in the cooling fluid.

10. The system of clause 9, wherein a first heat generating component has a first heat sink with a first width and a second heat generating component positioned above the first heat generating component in the direction of vapor flow has a second heat sink with a second width less than the first width.

11. The system of any preceding clause, the cooling fluid having a boiling point less than 90° Celsius.

12. The system of any preceding clause, the plurality of heat generating components including a vertical stack of heat generating components, wherein the vertical stack of heat generating components consists of central processing units.

13. The system of any preceding clause, wherein an average liquid to vapor ratio in the cooling volume is between 5% and 50%.

14. The system of any preceding clause, wherein the cooling volume is within 5 millimeters of the series.

15. The system of any preceding clause, wherein the series is oriented at an angle to a direction of vapor flow.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

It should be understood that any directions or reference frames in the preceding description are merely relative directions or movements. For example, any references to "front" and "back" or "top" and "bottom" or "left" and "right" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A system for thermal management of a computing device comprising:
    an immersion chamber;
    a plurality of heat-generating components positioned in the immersion chamber, including:
        a first set of heat-generating components positioned in a first vertical series, the first set of heat-generating components including a first heat-generating component, and a second heat-generating component positioned vertically above the first heat-generating component; and
        a second set of heat-generating components positioned in a second series positioned laterally apart from the first vertical series;
    a cooling volume comprising a volume of a cooling fluid within 5 millimeters around the first vertical series;
    a micro-condenser positioned adjacent the second series and configured to cool the second set of heat-generating components by condensing vapor bubbles of the cooling fluid from the second series to a liquid phase of the cooling fluid; and
    a diffusor positioned above the first heat-generating component between the first heat-generating component and the second heat-generating component, wherein the diffusor is angled from vertical and configured to:
        direct vapor bubbles of the cooling fluid that flow upward from the first heat-generating component to flow laterally out of the cooling volume and to the micro-condenser adjacent the second series to condense the vapor bubbles back to the liquid phase of the cooling fluid.

2. The system of claim 1, wherein a release edge of the diffusor is a non-straight edge that limits vortex formation upward off of the diffusor.

3. The system of claim 1, wherein the cooling volume is a vertical cylinder around the first vertical series where no portion of the vertical cylinder is within 5 millimeters of the plurality of heat-generating components.

4. The system of claim 1, wherein the micro-condenser is positioned about 2 millimeters from the second set of heat-generating components.

5. The system of claim 1, further comprising a condenser positioned in the immersion chamber and outside of a liquid phase of a cooling fluid.

6. The system of claim 1, wherein the immersion chamber is pressurized above atmospheric pressure.

7. The system of claim 1, further comprising a cooling fluid having a boiling point less than 90° Celsius positioned in the immersion chamber.

8. The system of claim 1, wherein the diffusor is positioned between the first heat-generating component and the second heat-generating component and angled such that a liquid-to-vapor ratio at the second heat-generating component and in the cooling volume is less than 50% to prevent dry out at the second heat-generating component.

9. The system of claim 1, wherein the second series is a second vertical series and the second set of heat-generating components are vertically aligned in the second vertical series.

10. The system of claim 1, wherein the micro-condenser is a solid-state cooler.

11. The system of claim 1, wherein the diffusor is one of a plurality of diffusors positioned between the heat-generating components of the first set of heat-generating components and configured to direct vapor bubbles from each of the heat-generating components of the first set of heat-generating components to the micro-condenser positioned adjacent the second series.

12. The system of claim 1, wherein the second series does not include diffusors positioned between the heat-generating components of the second set of heat-generating components.

13. The system of claim 1, wherein the cooling volume is a volume within 5 millimeters of the first vertical series for convectively transferring heat from the first set of heat-generating components to the cooling fluid in the cooling volume.

14. The system of claim 1, wherein the cooling volume is a first cooling volume of the first vertical series, and wherein the micro-condenser is positioned within a second cooling volume of the second series within 5 millimeters around the second series to cool the second series by condensing vapor bubbles within the second cooling volume back to the liquid phase, and wherein the micro-condenser is not positioned within the first cooling volume.

\* \* \* \* \*